(12) United States Patent
Bresniker

(10) Patent No.: US 6,678,155 B1
(45) Date of Patent: Jan. 13, 2004

(54) MODULAR SYSTEM OF INTERNET SERVICE PROVIDER FOCUSED COMPUTER SERVICES

(75) Inventor: Kirk M. Bresniker, Roseville, CA (US)

(73) Assignee: Hewlett-Packard Company, Houston, TX (US)

(*) Notice: Subject to any disclaimer, the term of this patent is extended or adjusted under 35 U.S.C. 154(b) by 0 days.

(21) Appl. No.: 09/461,169

(22) Filed: Dec. 14, 1999

(51) Int. Cl.[7] .................................................. H05K 7/20
(52) U.S. Cl. ...................... 361/687; 361/685; 361/726; 312/223.6; 455/127; 320/106
(58) Field of Search .................. 361/687, 680–686, 361/724–727; 312/223.1–223.6; 455/126, 127; 379/89; 320/106

(56) References Cited

U.S. PATENT DOCUMENTS

| 5,460,441 A | | 10/1995 | Hastings et al. |
| 5,657,376 A | * | 8/1997 | Espeut et al. ................. 379/89 |
| 5,844,400 A | * | 12/1998 | Ramsier et al. ............. 320/106 |
| 5,877,938 A | | 3/1999 | Hobbs et al. |
| 6,058,019 A | | 5/2000 | Graves et al. |
| 6,327,462 B1 | * | 12/2001 | Loke et al. ................... 455/127 |

FOREIGN PATENT DOCUMENTS

| WO | WO 96/06483 | 2/1996 | .......... H03M/11/00 |

* cited by examiner

Primary Examiner—Darren Schuberg
Assistant Examiner—Hung Van Duong

(57) ABSTRACT

The present invention relates to the efficient distribution of equipment for communication modules in a communication networking environment. Where a plurality communication devices serves a networking function, economy of cost and space are obtained by providing equipment and functionality for the individual computing devices from a centralized location such as a base station thereby enabling a simpler and less expensive design for the individual communication devices. The individual computing devices may thereby be made much smaller effecting savings in space at an Internet service provider location. Savings are also obtained by reducing the total number of components required and by reducing the total power consumption of the totality of the hardware in the network. Equipment most amenable to removal from the individual units and centralization in a base station include the main power supply, backup power supply, cooling fans.

16 Claims, 3 Drawing Sheets

MODULAR SYSTEM OF INTERNET SERVICE PROVIDER FOCUSED COMPUTER SERVICES

TECHNICAL FIELD

This invention relates in general to computer networking and in particular to efficiently distributing components among a number of computing devices connected to a network.

BACKGROUND

In the field of computer networking in general and of Internet service providers (ISPS) in particular, the computational work is generally distributed among a substantial number of relatively inexpensive computer systems. The deployment of a large number of computer systems generates a need to effectively manage and control the various systems. A considerable amount of interconnection between the systems and supervisory equipment may be necessary in order to achieve the required management and control.

Generally, a single small computer has been employed to operate as a server. A drawback of this approach is that the computers employed are generally multi-function machines whose equipment and functionality incurs costs due to the equipment itself and due to the physical space required to house the equipment. The narrow dedicated task of operating as a communication server makes much of the equipment and functionality of a general purpose computer unnecessary. A wasted expense is therefore being incurred in the server systems of the prior art.

The square footage occupied by equipment at Internet service provider sites is an important cost factor for Internet service providers. Accordingly, where space is being occupied by equipment not necessary for operation of server equipment, money paid for such wasted space represents an ongoing wasted expense for the service provider. Such a wasted expense may be very economically detrimental in the highly competitive ISP market. A way to avoid such wasted expenditure is therefore desirable.

One prior art approach to reducing the expense associated with the square footage required for servers has been to miniaturize the componentry of server-computers and the boxes housing the servers as much as possible. Unfortunately, for many components, limits are encountered making further miniaturization either impossible or cost prohibitive. Certain devices such as power supplies and voltage converters (referred to hereafter as "converters") are among the devices for which miniaturization beyond a certain point causes the increase in expense of the components to surpass the cost savings experienced by any reduction in required area enabled by the reduced component size. In other cases, reduction of components beyond a certain point is unavailable due basic physical laws.

Therefore, it is a problem in the art that prior art servers generally employ general purpose computers having a range of features which are not productively employed by the servers.

It is a further problem in the art that extraneous equipment and features of prior art server computers cause Internet service providers to incur costs which do not benefit the provision of Internet access.

It is a still further problem in the art that extraneous equipment and features cause prior art server computers to occupy valuable square footage without providing any benefit to the ISP.

It is a still further problem in the art miniaturization efforts as applied to server computers experience limitations due to physical lower limits on the size of certain devices.

It is a still further problem in the art that certain prior art miniaturization efforts are cost ineffective because a point is reached at which further miniaturization costs more money than is saved by the associated reduction in square footage of the server footprint.

SUMMARY OF THE INVENTION

These and other objects, features and technical advantages are achieved by a system and method which efficiently distributes equipment and functionality between a central interface device and a one or more server modules, or communication modules, in a communication network so as to employ minimum space and incur minimum expense for each module and for an entire particular networking operation or integrated server system. Where prior art devices employed a plurality of computing modules containing redundant equipment and functionality, the inventive mechanism preferably operates to concentrate such redundant equipment and functionality in a central device or base station to as to reduce to a minimum the equipment and functionality remaining in the one or more communication modules or servers. In this manner, economies of scale may be achieved by deploying a single centralized device in place of a plurality of similar devices distributed among a plurality of communication devices or modules.

Herein, a combination of a base station or other central interface in combination with one or more connected modules interacting with the base station is referred to as an "integrated server system." Individual communication devices operating as servers are referred to herein as "communication modules," "computing modules," and "server modules." The term "processing component" is used herein to denote a component, preferably located on a server module which serves a core function of the module such as communication and computation.

Herein, the term "servicing component" is used to denote a component which serves a support function on a server module including but not limited to providing power and removing excess heat from the module. Preferably, servicing components may be located on a base station or other centralized device and provide a function on a server module via an appropriate connection. Centralization of such servicing components in the base station preferably enables reduction in the size and expense of the server modules.

Cost savings may be achieved by deploying server modules whose functionality is well matched to the single dedicated task demanded of them, rather than employing general purpose devices such as personal computers which include a substantial amount of equipment and functionality not relevant to the server function. Further cost savings may be achieved by reducing the size and power consumption of the various server modules. Reducing the size of the server modules may substantially reduce costs because of the substantial cost of physical space in many networking environments, including ISPs.

In a preferred embodiment, the inventive mechanism may be applied to server systems generally deployed at Internet Service Provider (ISP) sites. A combination of a base station having various centralized operations and one or more server modules having a minimized set of functions may be efficiently substituted for the prior art practice of employing a separate small computer system for each server. Such a distribution of resources enables far greater miniaturization of the server modules than is possible with servers consisting of stand-alone personal computers and the attendant cost reduction owing to a reduction in required square footage at the ISP sites. Generally, components which either cannot be reduced in size beyond a certain point, or which are prohibitively expensive to further miniaturize, are those most efficiently centralized within a base station.

In a preferred embodiment, power devices may be productively centralized at a base station and power lines directed out to a plurality of computing modules. Herein, "centralizing" refers to disposing a particular piece of equipment in the base station and then preferably omitting this piece of equipment from the one or more communication or server modules connected to the base station. Preferably, such centralization enables the integrated server system to have one piece of a particular type of equipment in a base station thereby enabling a same or analogous piece of equipment to be beneficially removed from all of the server modules connected to the base station. It may be seen that the process of centralization may produce considerable economy by both avoiding the capital cost of the component in each of the server modules and by reducing the amount of space occupied by each module, wherein such space reduction leads to further cost reduction for Internet service providers. In certain cases, further economy may be obtained by reducing the energy consumption of the overall integrated server system and thereby reduce the electrical utility expense associated with such energy consumption.

Preferably, both primary and backup power supplies may be centralized at a base station and appropriate power lines connected between the base station and the various server modules to supply each module with required operating power and backup power in case of interruption of the primary or main supply. Converters may also be centralized in the base station thereby enabling lower and thereby safer voltage levels to be employed by the base station to power the various modules.

In a preferred embodiment, cooling equipment may be advantageously centralized in the base station. Fans, or other air flow equipment, and associated air flow paths may be advantageously centralized by locating a fan in a base station and disposing a plurality of modules in communication with the base station and with each other such that a single air flow path can simultaneously cool the plurality of modules. The cost and space requirement incurred by disposing a fan in each computing module is thereby avoided while still providing an effective cooling solution. Preferably, the reduced amount of equipment in the modules (the omitted fan included) operates to reduce the overall cooling burden thereby reducing associated power consumption and the cost of the same.

In a preferred embodiment, certain communication functions may also be advantageously centralized thereby diminishing both the complexity of and the amount of cabling required for a collection of modules. For example, a prior art arrangement may involve connecting a user data LAN cable to each of a plurality of computing modules or communication modules. This traditional arrangement would require that a separate cable extend from each of the computers or modules to a central location thereby requiring large number of connections and a substantial total length of cabling. In the present invention, a single high speed user data LAN connection may be made to a base station which is in physical contact with the plurality of server modules. Data traveling on the single high speed LAN connection may then be directed to and from the appropriate modules employing an appropriate protocol. In this case, there would be both control data and user data LAN connections on the base station for attachment to the modules. One exemplary protocol for communication to the various modules is IEEE 802.3 100 bT Fast Ethernet. Preferably, the system will be upgradable to support Gigabit Ethernet when support for copper-based interconnect is widely available. It will be appreciated however, that the present invention is not limited to the deployment any one communication protocol.

Such centralization of network communication connections preferably reduces the number of cable connections required, the total length of cable required, and the overall complexity of the network. Furthermore, operation, maintenance, and repair of the totality of the hardware at the ISP is preferably beneficially affected by the reduction by the reduction in hardware and interconnection complexity presented by the inventive approach.

Therefore, it is an advantage of a preferred embodiment of the present invention that the individual modules contain equipment dedicated to a networking function and omit extraneous features and equipment, thereby avoiding the direct expense of such extraneous equipment as well as the ongoing expense of the square footage such equipment would otherwise occupy.

It is a further advantage of a preferred embodiment of the present invention that the expense and technical difficulties associated with miniaturization of components is avoided by removing selected components from the individual server modules and centralizing the function of such components in base station or other central interfacing device.

It is a still further advantage of a preferred embodiment of the present invention that selectively removing selected components from the plurality of server modules reduces the capital cost of the modules.

It is a still further advantage of a preferred embodiment of the present invention that omitting selected components from the plurality of server modules reduces the footprint of each of the modules thereby reducing the cost of space incurred by the ISP for a given number of modules.

It is a still further advantage of a preferred embodiment of the present invention that power consumption of the simplified server modules is reduced over that experienced by general purpose computers of the prior art.

It is a still further advantage of a preferred embodiment of the present invention that control, maintenance, and repair of the totality of equipment at an ISP site may be simplified by reducing the total number of components and cabling connections required for operation of the various server modules.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
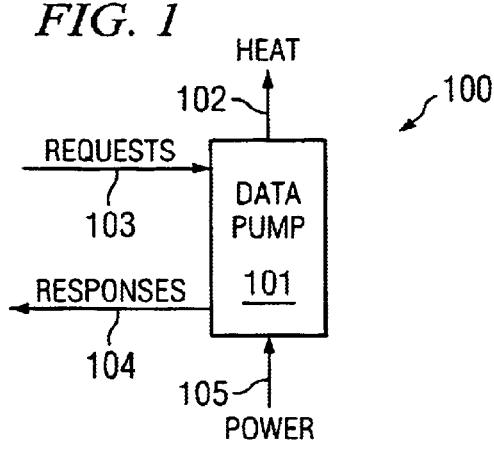
FIG. 1 is a depiction of the functionality of a computing module according to a preferred embodiment of the present invention.

FIG. 1 is a depiction of the functionality of a communication module 101 according to a preferred embodiment of the present invention. Preferably, the communication module 101 operates as a "data pump," receiving required power from an external source, venting excess heat to an external thermal sink and limiting its attention to receiving requests 103 and generating responses 104. Preferably, maximum efficiency is obtained by restricting the activity of the server module to data communication and processing and having overhead and utility services provided in a coordinated and centralized manner by a device external to the module. The equipment preserved in module 101 is preferably miniaturized to the maximum extent possible to preserve valuable square footage at a communication network site which may be an ISP. Preferably, equipment which is "incompressible,", meaning equipment which is either physically impossible to compress or which is cost-ineffective to compress is removed from the server modules and centralized in a central interface which may be a base station as is discussed in connection with FIG. 5. In general, module 101 will comprise all equipment which a standard personal computer server would have except for "incompressible" devices such as power supplies, converters, and fans. The contents of a standard personal computer server are well known in the art and will therefore not be discussed in detail herein.

Figure 2:
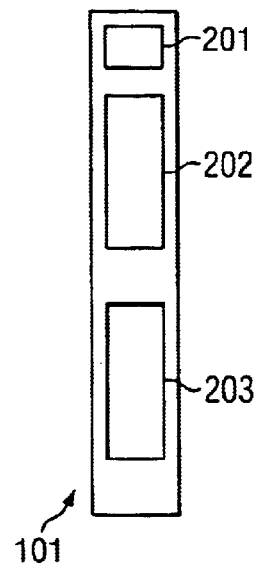
FIG. 2 is a front view of a computing module according to a preferred embodiment of the present invention.

FIG. 2 is a front view of a communication module or server module 101 according to a preferred embodiment of the present invention. In a preferred embodiment, server module 101 is a vertically mounted brick module. However, it will be appreciated that the server module 101 could comprise a wide range of shapes and be mounted employing a wide range of orientations, and all such variations are within the scope of the present invention.

Figure 5:
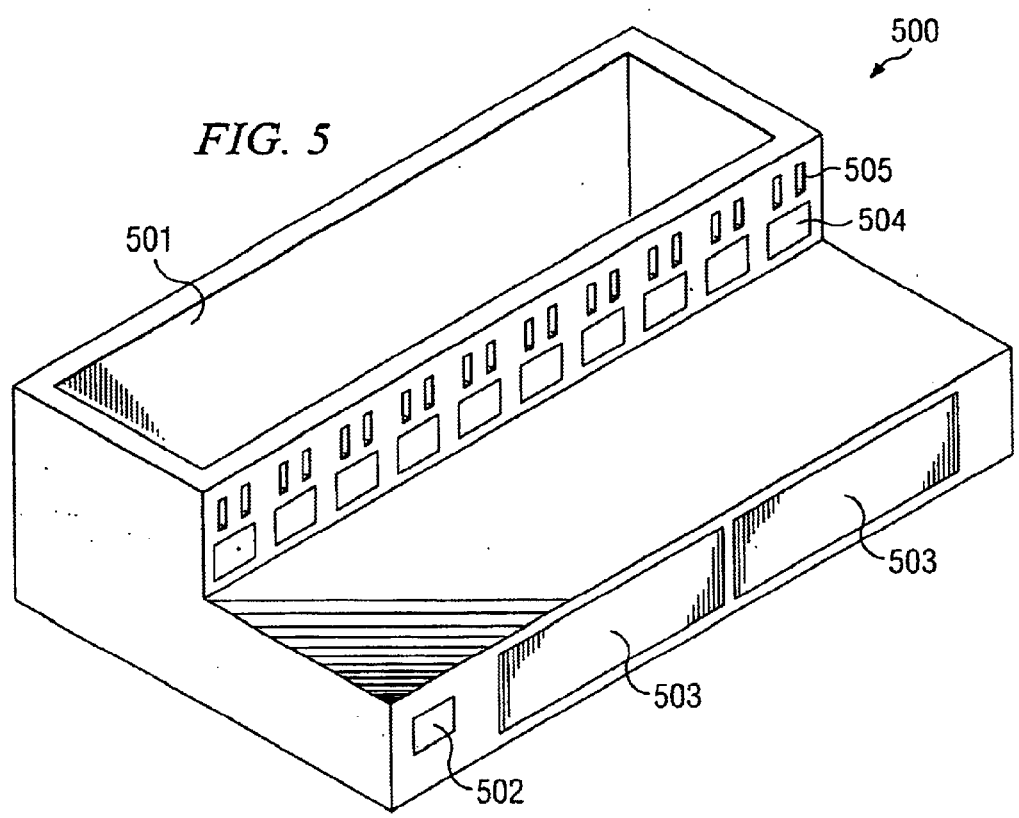
FIG. 5 depicts a base station according to a preferred embodiment of the present invention.

In a preferred embodiment, server module 101 includes a combination switch and power activity indicator 201 and two slots 202 and 203 to accept Network Interface Cards (NIC). Preferably, power is supplied to power connection 302 (FIG. 3) from a central device such as power station 500 (FIG. 5). It will be appreciated that in alternative embodiments, each server module 101 could include a plurality of power connections. In yet another alternative embodiment, power for server module 101 may be supplied by an internal battery or other source and omit an external power connection.

In a preferred embodiment, switch and power activity indicator 201 includes a lamp which indicates the current state of the unit. One possible color scheme for the lamp includes displaying red for a failure condition, green for an operational condition, and an unlit condition to indicate that the power is off. It will be appreciated that any number of color schemes may be substituted for the exemplary scheme recited, and that all such variations are within the scope of the present invention. Preferably, the switch portion of switch and power activity indicator 201, or the "switch" initiates activity which is dependent upon the current state of module 101.

In a preferred embodiment, the switch may perform a range of activities depending upon a currently active state of module 101. For example, if the power is off, activating the switch could turn power to the module on and initiate a self-test for module 101. Where the module is powered up, but not running an application, one function of the switch could be to initiate data processing by module 101. If module 101 is running an application, one available function of the switch could be to initiate a controlled shutdown of module 101 operation. It will be appreciated that the switch is not limited to providing only one function for each operating state of module 101.

In an alternative embodiment, the switch could be accompanied by a text-capable display and a plurality of function-specific buttons to enable control of a greater number of operations. Preferably, a user interface is provided which enables a human operator to effectively service a module without having to attach external equipment, such as a computer terminal, to the module.

In an alternative embodiment, the module 101 is not limited to having two slots for communication purposes but may include one slot or more than two slots. The invention is not limited to the attachment of NICs but may accommodate other communication connection/interface devices including but not limited to: Fibrechannel and Fiber Distributed Data Interface (FDDI). Preferably, the two NICs may be used to provide isolated connections between an end-user private network and the Internet backbone. Alternatively, the two NICs could be used to provide redundant connections to either an end-user private network or the Internet backbone.

Figure 3:
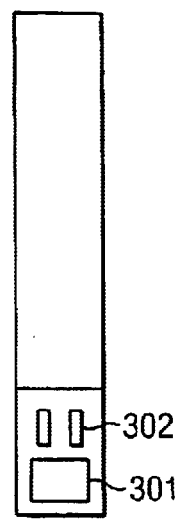
FIG. 3 is a rear view of a computing module according to a preferred embodiment of the present invention.

FIG. 3 is a rear view of server module 101 according to a preferred embodiment of the present invention. Preferably the lower portion of the rear portion of module 101 docks at base station 500 (FIG. 5) or other appropriate central device. Power connection 302 enables the base station 500 to power server module 101 while the module is docked at base station 500. The provision of power to server module 101 from power connection 302 preferably removes the need for an internal power supply within module 101 thereby saving space in module 101 and avoiding the expense of providing a separate power supply in module 101.

In a preferred embodiment, control data LAN connection 301 enables control data communication between module 101 and base station 500 pass through connection 301. Such control data communication may include, but is not limited to, system operator console communications.

Generally, a user data LAN connection cable will be directly attached to module 101, bypassing base station 500. Alternatively however, a connection between module 101 and base station 500 (FIG. 5) similar to port 301 may be implemented which will provide a user data LAN connection between module 101 and base station 500.

Figure 4:
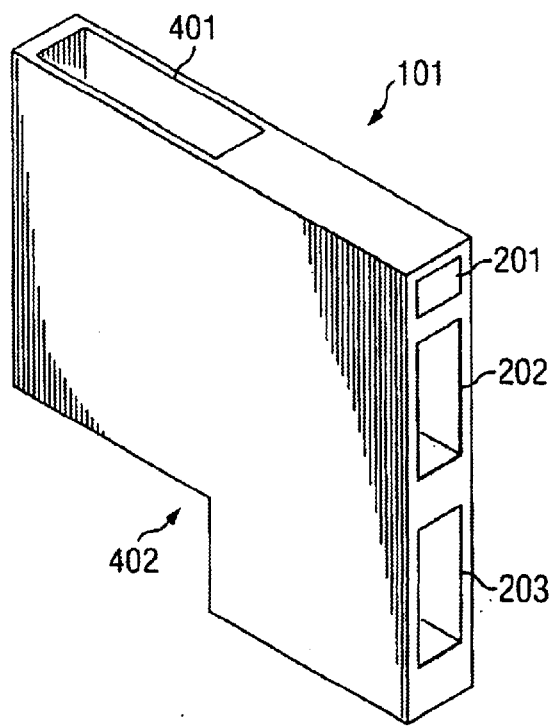
FIG. 4 is a perspective view of a computing module according to a preferred embodiment of the present invention.

FIG. 4 is a perspective view of a communication module 101 according to a preferred embodiment of the present invention. Preferably, module 101 includes a cutaway portion 402 enabling the server module 101 to be effectively docked at base station 500 (FIG. 5) while making LAN and power connections through ports 301 and 302 (FIG. 3) respectively.

In a preferred embodiment, removal of excess heat from server module 101, base station 500, and other modules 101 docked at base station 500 is accomplished in a coordinated manner employing air moving equipment, such as an electric fan, preferably located within base station 500. Providing a fan or other cooling device in the base station preferably obviates the need to provide such a device in each module. Omitting the fan and associated electrical circuitry from module 101 aids in reducing the size of, and power consumption by, module 101. Establishing a coordinated ventilation system preferably enables centralized active cooling equipment (such as motorized fans) to cool the base station 500 and all attached modules 101 simultaneously. Accordingly, an air channel 401 is preferably disposed in module 101 to allow air flow to pass through module 101 and to remove excess heat therefrom.

Alternatively, air moving equipment may be disposed within individual modules 101 to enhance cooling air flow through the modules 101. Such module air moving equipment may be alternative to, or in addition to, the air moving equipment in base station 500.

FIG. 5 depicts a base station 500 according to a preferred embodiment of the present invention. FIG. 5 depicts two power supplies 503, a main power supply and a backup supply. Also shown is control LAN connection 502 and base station air channel 501. In the region where the server modules dock with the base station, a plurality of power connections 503 and a plurality of control LAN connections 504 for connection to the various modules are shown. In a preferred embodiment, control LAN connection 502 enables control data communication between base station 500 and Internet switching equipment and/or to other base stations.

In a preferred embodiment, disposing main and backup power supplies 503 in the base station preferably eliminates the need for disposing power supplies in the plurality of server modules 101 to be connected to base station 500. This arrangement preferably results in economy arising from the costs savings arising from omitting power supplies in each of the modules 101. Preferably, economies of scale are incurred by employing one main power supply thereby causing less total energy to be consumed by the totality of the modules in combination with the base station resulting in still further power and financial savings. Further, the provision of docking station power connections 505 for the modules 101 preferably eliminates the need for running AC power cords or connections to each of the modules, thereby causing the power connections for the modules to occupy less space and be less cumbersome.

In an alternative embodiment, the modules could be fitted with batteries for power backup purposes. In yet another alternative embodiment, wired backup power could be provided to one or more critical modules to provide additional backup in the event of multiple failures in the other system power supplies.

In a preferred embodiment, one or more converters are located in the base station 500, thereby preferably removing a need to place converters in the individual modules attached to the base station. Omitting converters from the modules presents the benefit of avoiding the cost of the converter itself in each of the modules. A further benefit is derived from the reduction of in the module footprint enabled by having one less component included within its housing. Further, performing AC to DC transformation within the base station 500 enables moderate level D.C. voltage levels to be directed to the docking station power connections for connection to the modules. Providing power to the modules in this manner preferably provides greater safety and convenience than directing high level AC voltages directly to the modules.

Figure 8:
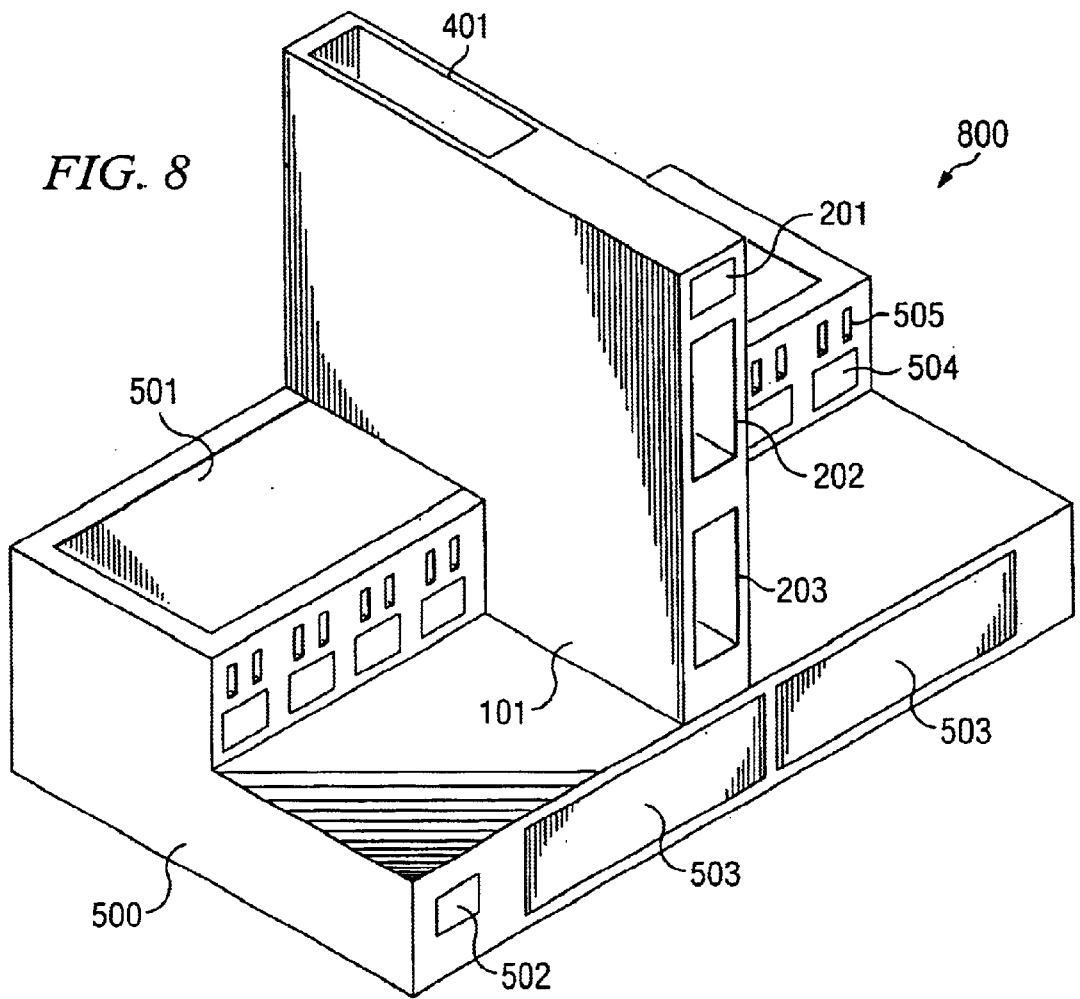
FIG. 8 depicts a module of FIG. 4 attached to the base station of FIG. 5.

In a preferred embodiment, an integrated cooling mechanism is preferably implemented in place of having separate fans and ventilation paths in each of the modules 101. Base station 500 preferably comprises air moving equipment such as an electrically powered fan for directing air through base station air channel 501 and through module air channel(s) 401. Preferably, modules 101, when properly docked on base station 500, operate to substantially align base station air channel 501 and module air channel 401 to thereby form a single coordinated ventilation path between the base station 500 and the modules 101 and a centralized cooling mechanism for the integrated server system. This arrangement is shown in FIG. 8, which depicts a module 101 of FIG. 4 attached to the base station 500 of FIG. 5. This system 800 could have more than one module 101 attached to the base station 500.

In a preferred embodiment, the fan or other air moving mechanism (not shown) in base station 500 forces air through base station air channel 501 and module air channel 401 (FIG. 4) (for all modules 101 docked on base station 500), thereby acting to remove excess heat from the base station 500 and all attached modules 101 simultaneously. Deploying a coordinated cooling mechanism as described above preferably removes the need to deploy fans and ventilation paths independently in the various modules 101 thereby conserving valuable space in the modules and avoiding the cost of purchasing fans for each of the server modules.

It will be appreciated that FIG. 5 depicts but one embodiment of a centralized and coordinated cooling system for the integrated server system. The cooling path could be disposed in a number of alternative geometric configurations without departing from the scope of the present invention. FIG. 5 depicts vertically oriented modules placed side by side wherein each module has an air channel which is aligned with a base station air module. In the case of FIG. 5, the cross sectional geometry of the base station air channel spans the cross sectional areas of the air channels of all modules which may be attached to the base station.

In one alternative embodiment, the modules 101 may be stacked vertically and share a common cooling path with each other and with the base station 500, wherein the air channels of the base station and each of the modules would have the same cross sectional area and all be substantially aligned. In another alternative embodiment, cooling equipment is not limited to fans and other air moving equipment but may include closed refrigeration systems to provide more powerful cooling for the integrated server system, and all such variations are included within the scope of the invention.

Figure 6:
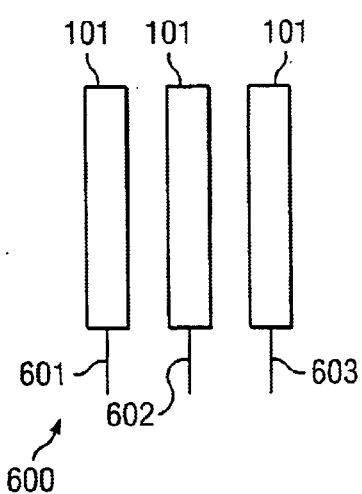
FIG. 6 depicts a simplified view of a set of modules having independent user data LAN connections according to a preferred embodiment of the present invention; [and]

FIG. 6 depicts a simplified view 600 of a set of modules having independent user data LAN connections according to a preferred embodiment of the present invention. Three modules 101 are shown each having separate user data LAN connections, 601, 602, and 603 respectively. Generally, a separate LAN cable and connection will be needed for each module or server 101.

Figure 7:
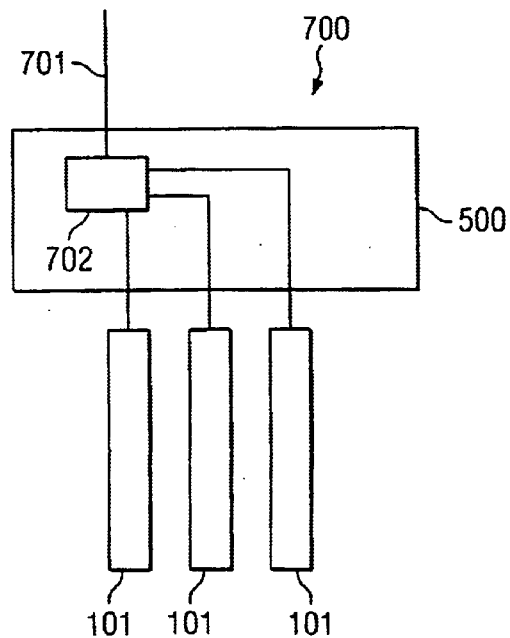
FIG. 7 depicts a simplified view of a set of modules connected to a base station having a single user data LAN connection to a base station according to a preferred embodiment of the present invention.

FIG. 7 depicts a simplified view 700 of a set of modules connected to a base station 500 having a single user data LAN connection 701 to the base station 500 according to a preferred embodiment of the present invention. In a preferred embodiment, the separate user data LAN connections to each server module 101 may be omitted in favor a single LAN connection 701 to base station 500.

In a preferred embodiment, user data LAN connection 701 carries all user data to be received by, and transmitted from, the server modules 101 connected to base station 500. Preferably, user data LAN connection 701 is attached to network switching card 702 which appropriately directs information between LAN connection 701 and the modules 101. This approach simplifies and reduces the LAN cabling requirements since preferably only one LAN connection to base station 500 will be needed to service all modules 101 in the integrated server system. Connection of modules 101 via their I/O function slots 202 and 203 (FIG. 2), which may be Compact Peripheral Component Interface (CPCI) slots, will generally not be needed when employing the configuration of FIG. 7.

In a preferred embodiment, a network switching card 702 is preferably deployed in base station 500 to enable LAN connection 701 to service the plurality of modules 101. When employing the embodiment of FIG. 7, two LAN connections will generally be available for modules 101 on the docking area of base station 500, one LAN connection for control data 504 as discussed in connection with FIG. 4, and a second LAN connection for user data being communicated between end users and the Internet backbone. Preferably, deployment of the centralized user data LAN embodiment described in connection with FIG. 7, operates to further remove functionality from individual server modules and centralize such functionality in the base station 500. After user data has passed from user data LAN connection 701 through network switch card 702, the information is preferably directed to the appropriate module 101 among the modules docked at base station 500.

Preferably, the internal connections between network switch card 702 and the various modules 101 are simpler and less cumbersome than deploying direct LAN cable connections directly to each module. For example, the connections may be made to the modules employing a backplane board or other compact integrated approach. Accordingly, as with other functions centralized within the base station, the centralized user data LAN option may operate to reduce the size and power consumption of each module, thereby adding convenience and saving money.

In a preferred embodiment, connection of the switch card 702 to the modules 101 is preferably facilitated by the deployment of a modular connection scheme between the base station 500 and the modules. One exemplary physical connection scheme includes using blind-mate female connectors on the individual modules and a mating array of male pins on a rigid backplane on base station 500. Alternatively, the deployment of male and female pins may be reversed. Further, both the modules 101 and the base station 500 may include a combination of male and female connectors, and all such variations are included within the scope of the present invention.

In a preferred embodiment, the connection scheme between the base station 500 and modules 101 enables power transmission to the modules 101 as well as data communication between the base station 500 and the modules 101. Preferably, the physical connection scheme on base station 500 is established so as to permit less than all the pins or holes at a particular docking station within base station 500 to be connected for a particular module. Such a connection preferably beneficially enables modules with limited connectivity and power consumption to be connected to a standard docking station on base station 500 while connecting to only a subset of all the connecting pins and holes at the docking station. Preferably, the ability of modules with limited functionality to connect to a subset of pins or holes at a docking station enables the cost of such modules to be significantly reduced.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An integrated communication server system, the system comprising:
   at least one server module;
   a base station having at least one servicing component for providing a service to said at least one server module, wherein said at least one server module is attachable to said base station;
   wherein at least one said servicing component comprises air moving equipment for cooling said integrated server system, an air duct disposed in each of said at least one server modules, and a central air duct disposed in said base station, wherein said central air duct and said at least one air duct are substantially aligned to provide a substantially continuous air passage linking said base station and said at least one module, thereby enabling said air moving equipment to cool said integrated server system.

2. The system of claim 1, wherein said at least one servicing component further comprises:
   a power supply, wherein the power supply is disposed within the base station and supplies power requirements of said at least one server module.

3. The system of 1, further comprising:
   a single user data LAN connection disposed in said base station; and
   a network switch card in communication with said user data LAN connection, disposed in said base station; and
   one internal connection between said network switch card for each of said at least one server modules, thereby enabling said single user data LAN connection disposed in said base station to service said at least one server module.

4. The system of claim 2, wherein said at least one servicing component further comprises:
- a converter, thereby enabling provision of a safe and convenient D.C. voltage to said at least one server module by said base station.

5. A method for disposing an integrated server system in a minimum footprint, the method comprising the steps of:
- providing equipment in a base station able to serve at least one server module in said integrated server system, wherein equipment provided in said base station is centralized equipment;
- connecting said base station and said at least one server module to enable said centralized equipment to perform at least one function in said at least one server module;
- aligning an air duct in said base station with an air duct in each of said at least one server modules, thereby providing a continuous air flow path through said base station and said at least one server module; and
- generating an air flow in said base station able to remove excess heat from said base station and said at least one server module that uses the continuous air flow path.

6. The method of claim 5, wherein the step of providing comprises the steps of:
- disposing a power supply in the base station able to provide operating power to said at least one server module; and the step of connecting comprises the step of:
  - connecting said power supply in said base station to said at least one server module, thereby providing power to said at least one server module.

7. The method of claim 5, further comprising the steps of:
- disposing a user data LAN connection in said base station; and
- disposing a network switch card in communication with said user data LAN connection; and
- establishing data connections between the base station and said at least one server module.

8. The method of claim 6, comprising the further steps of:
- converting AC voltage to DC voltage in said base station; and wherein said step of connecting comprises the step of:
  - connecting a DC voltage source in said base station to said at least one server module.

9. An integrated server system, the system comprising:
- a base station having a plurality of docking stations;
- a plurality of server modules docked in said docking stations on said base station, thereby forming an integrated server system.

10. The system of claim 9, further comprising:
- a single power supply disposed in said base station; and
- a power port disposed in each of said plurality of said docking stations for supplying power to said plurality of server modules, thereby establishing a plurality of power ports and enabling omission of power supplies disposed locally in each server module and a conservation of a cost, and a space requirement, of a plurality of locally disposed power supplies, wherein a single external power connection may be made to power said integrated server system.

11. The system of claim 9, the system further comprising:
- a single fan disposed in said base station; and
- at least one air flow path substantially continuous throughout said base station and said plurality of server modules, wherein said single fan moves air through said at least one substantially continuous air flow path to thereby cool said integrated server system, thereby enabling omission of fans locally disposed in each of said plurality of server modules and enabling a saving of space and cost associated with said omission of locally disposed fans.

12. The system of claim 9, further comprising:
- a control data LAN connection disposed in each of said plurality of docking stations, thereby enabling interchange of control data between said plurality of server modules and said base station.

13. The system of claim 9, further comprising:
- an external control data LAN connection disposed on said base station to enable an interchange of control data between said base station and at least one other communication system.

14. The system of claim 9, further comprising:
- an external user data LAN connection disposed on said base station to enable interactive communication between said server modules on said base station and at least one other communication system;
- a user data LAN connection disposed in each of said plurality of docking stations, thereby establishing a plurality of user data communication paths internal to said base station for use by said plurality of server modules; and
- a network switch card disposed within said base station to appropriately direct data communication between said external user data LAN connection and said plurality of server modules, wherein a combination of said external user data LAN, said network switch card, and said plurality of internal user data communication paths obviate a need for external user data LAN connections to said plurality of server modules, thereby reducing an amount and a complexity of cabling in said integrated server system.

15. The system of claim 10, the system further comprising:
- a converter disposed in said base station, thereby enabling a plurality of power connections between said base station and said plurality of server modules to provide a safe, low level D.C. voltage at said power ports.

16. The system of claim 11, further comprising:
- a central air channel disposed in said base station in communication with said single fan; and
- a local air channel disposed in each of said plurality of server modules, wherein each said local air channel is substantially aligned with said central air channel disposed in said base station, thereby forming at least one substantially continuous air flow path through said integrated server system, thereby enabling said single fan to remove excess heat from substantially all of said integrated server system.

* * * * *